(12) United States Patent
Donatelli et al.

(10) Patent No.: US 8,966,023 B2
(45) Date of Patent: Feb. 24, 2015

(54) ADJUSTING SOFTWARE SETTINGS

(75) Inventors: Alessandro Donatelli, Rome (IT); Barbara Febonio, Rome (IT); Filomena Ferrara, Rome (IT); Mario Loriedo, Rome (IT); Tommaso Mazzarotto, Rome (IT); Sandro Piccinini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/414,806

(22) Filed: Mar. 8, 2012

(65) Prior Publication Data

US 2012/0173669 A1 Jul. 5, 2012

Related U.S. Application Data

(62) Division of application No. 12/294,566, filed as application No. PCT/EP2007/051894 on Feb. 28, 2007.

(30) Foreign Application Priority Data

Apr. 12, 2006 (EP) ..................................... 06112555

(51) Int. Cl.
*G06F 15/177* (2006.01)
*H04L 29/08* (2006.01)
*G06F 17/30* (2006.01)

(52) U.S. Cl.
CPC ........ *H04L 67/306* (2013.01); *G06F 17/30905* (2013.01)
USPC .......................................... 709/220; 707/695

(58) Field of Classification Search
CPC ........................... G06F 9/44505; G06F 9/4451
USPC ................. 709/217, 223, 200, 219, 220, 206; 715/502; 717/136, 174–178, 113; 707/610, 614, 695, 790, 100; 713/1
See application file for complete search history.

(56) References Cited

U.S. PATENT DOCUMENTS

| 5,428,785 A | 6/1995 | Morel et al. |
| 5,442,506 A | 8/1995 | Kang |

(Continued)

FOREIGN PATENT DOCUMENTS

| EP | 1 396 980 A1 | 3/2004 |
| WO | WO 99/33293 | 7/1999 |

(Continued)

OTHER PUBLICATIONS

U.S. Appl. No. 12/294,566.

(Continued)

*Primary Examiner* — Hung T Vy
(74) *Attorney, Agent, or Firm* — Francis Lammes; Stephen J. Walder, Jr.; Jeffrey S. LaBaw

(57) ABSTRACT

An arrangement permitting a user for example in a internet point or using a different profile in the same machine can connect to a web server to download and install local client software such as a java application or a browser plug-in the first time he accesses to this service from that browser in order to customize his environment. Once authenticated, he can choose the personalization to be performed in whatever application installed and eligible to be user customizable. For example he can replicate in the system his browser settings (favorites, cookies, forms etc) or word templates as a clone of environment setting of his personal machine. The customization can depend on pre-defined profiles to allow the user customization of a subset of settings, for example only browser settings. Models of different operating environments are defined and called upon to enable interactions with different client devices.

15 Claims, 6 Drawing Sheets

(56) References Cited

U.S. PATENT DOCUMENTS

| | | | |
|---|---|---|---|
| 5,813,006 A | 9/1998 | Polnerow et al. | |
| 6,735,691 B1* | 5/2004 | Capps et al. | 713/1 |
| 6,963,908 B1* | 11/2005 | Lynch et al. | 709/220 |
| 7,032,011 B2* | 4/2006 | Woodard et al. | 709/220 |
| 7,263,663 B2* | 8/2007 | Ballard et al. | 715/762 |
| 7,379,965 B2 | 5/2008 | Sherwood et al. | |
| 7,447,806 B2* | 11/2008 | Reyes et al. | 710/8 |
| 7,603,657 B2* | 10/2009 | Gassner et al. | 717/113 |
| 7,747,648 B1* | 6/2010 | Kraft et al. | 707/790 |
| 7,774,349 B2 | 8/2010 | Horvitz et al. | |
| 8,010,997 B2* | 8/2011 | Limont et al. | 726/3 |
| 8,055,689 B1* | 11/2011 | Wookey | 707/814 |
| 2002/0104080 A1* | 8/2002 | Woodard et al. | 717/176 |
| 2003/0055928 A1 | 3/2003 | Machida | |
| 2003/0195921 A1* | 10/2003 | Becker et al. | 709/200 |
| 2003/0225785 A1 | 12/2003 | Arellano | |
| 2004/0186901 A1 | 9/2004 | Guigui | |
| 2004/0187104 A1 | 9/2004 | Sardesai et al. | |
| 2004/0226010 A1 | 11/2004 | Suorsa | |
| 2004/0236843 A1* | 11/2004 | Wing et al. | 709/219 |
| 2005/0091576 A1* | 4/2005 | Relyea et al. | 715/502 |
| 2005/0132014 A1* | 6/2005 | Horvitz et al. | 709/206 |
| 2005/0144481 A1* | 6/2005 | Hopen et al. | 713/201 |
| 2006/0025985 A1* | 2/2006 | Vinberg et al. | 703/22 |
| 2006/0047780 A1* | 3/2006 | Patnude | 709/219 |
| 2006/0123104 A1* | 6/2006 | Spinelli et al. | 709/223 |
| 2006/0167829 A1* | 7/2006 | Dreyfus et al. | 707/1 |
| 2006/0200849 A1* | 9/2006 | Sundarrajan et al. | 725/110 |
| 2006/0242124 A1* | 10/2006 | Fields et al. | 707/3 |
| 2007/0038648 A1* | 2/2007 | Chetwood et al. | 707/100 |
| 2007/0067373 A1 | 3/2007 | Higgins et al. | |
| 2007/0180066 A1 | 8/2007 | Sherwood et al. | |
| 2007/0180386 A1 | 8/2007 | Ballard et al. | |
| 2007/0180432 A1* | 8/2007 | Gassner et al. | 717/136 |
| 2007/0198819 A1* | 8/2007 | Dickens et al. | 713/1 |
| 2009/0106266 A1 | 4/2009 | Donatelli et al. | |
| 2009/0112972 A1 | 4/2009 | Liu | |

FOREIGN PATENT DOCUMENTS

| | | |
|---|---|---|
| WO | WO 02/086738 A1 | 10/2002 |
| WO | WO 2007/066870 A2 | 6/2007 |

OTHER PUBLICATIONS

Communication pursuant to Article 94(3) EPC, Application No. 07 712 382.6-2201,EPO Form 2001 and EPA Form 2906, Jan. 20, 2009, 2 pages.

First Office Action from the State Intellectual Property Office of P.R. China dated Jun. 9, 2010 for Application No. 200780011558.8, 3 pages.

First Office Action from the State Intellectual Property Office of P.R. China dated Jun. 9, 2010 for Application No. 200780011558.8, Untranslated, 5 pages.

Text of the First Office Action from the State Intellectual Property Office of P.R. China dated Jun. 9, 2010 for Application No. 200780011558.8, English Translation, 7 pages.

Text of the Second Office Action from the State Intellectual Property Office of P.R. China dated Jun. 27, 2011, English translation, 11 pages.

Mehta, Bhaskar et al., "Ontologically-Enriched Unified User Modeling for Cross-System Personalization", User Modeling 2005 Lecture Notes in Computer Science; Lecture Notes in Artificial Intelligence; Spring-Verlag, Berlin, vol. 3538, 2005, pp. 119-123.

Niederee, Claudia et al., "A Multi-Dimensional, Unified User Model for Cross-System Personalization", Proceeding of the Workshop on Advanced Visual Interfaces, Gallipoli, Italy, May 25, 2004, pp. 1-11.

Summons to attend oral proceedings pursuant to Rule 115(1) EPC dated Aug. 5, 2013, 7 pages.

Office Action dated Oct. 23, 2013 for U.S. Appl. No. 12/294,566; 18 pages.

Final Office Action dated Apr. 15, 2014 for U.S. Appl. No. 12/294,566; 17 pages.

Interview Summary dated Jan. 28, 2014 for U.S. Appl. No. 12/294,566; 3 pages.

Response to Office Action filed Feb. 24, 2014, U.S. Appl. No. 12/294,566, 20 pages.

* cited by examiner

ADJUSTING SOFTWARE SETTINGS

This application is a divisional of application Ser. No. 12/294,566, filed Sep. 25, 2008, status pending.

FIELD OF INVENTION

Over recent years the number of computers and similar devices that an individual may have cause to use has increased rapidly. Not only will an individual use a computer at work and at home, but he may use several both at work and at home as well as the computers of friends and family and indeed publicly accessible computers in "cybercafes", and so on. Furthermore, the range of possible environments in terms of the operating system and applications continues to expand, as in any given case the user may encounter any selection from past and present offerings. The situation is still further complicated by the increasing capacity for software to be personalized or customized, so that no two computer setups are quite the same, even where considerable effort is made that they should be. Another factor is that local variations can come to represent an asset in their own right, for example in the form of "favorites" or "bookmark" information stored by web browsers and so on.

Users thus find themselves obliged to remember the configurations of numerous different systems, and to come to terms rapidly with new ones. This clearly imposes an undesirable burden on the user, which in a commercial environment is likely to translate into a reduction in productivity.

BACKGROUND ART

A wide range of partial solutions to these problems have been suggested.

Intel's® wireless Personal Server project provides a miniaturized computer lacking conventional I/O hardware such as a display or keyboard, but offers network connectivity. Software is installed on a client computer which enables it to communicate with the personal server, so that a user of the client computer can execute programs installed on the server and access files stored on it, using the client computer merely to provide access.

Intel's® Internet Suspend and Resume project uses virtual machine technology to generate a snapshot of a computer's state at a suspend time, which can then be transmitted to a remote site and loaded into a remote computer, from which the user may then resume his session from the stored data seamlessly.

IBM's® SoulPad project depends on a portable hard drive which can be connected to a modern computer using USB or firewire technology. The hard drive has a bootable operating system which is able to identify and control a wide range of hardware, such as the knoppix Linux® distribution. This operating system is able to run a second operating system on a virtual machine. Thus the drive can be plugged into any suitable computer, which when booted from the hard drive will present the same environment as on any other system. Compared with the personal server approach, the SoulPad approach eliminates wireless device association and power requirements. In contrast to both the personal server and internet suspend and resume approach, the SoulPad requires no particular software stack on the client computer.

Certain Microsoft Windows® domain environments offer a Roaming User Profiles feature. According to this, a user may have a roaming account on the domain, whereby whenever he logs onto a computer connected to the domain, personal setting data is retrieved from the domain server, rather than the local computer. When the user logs off again, the information is uploaded to the server. This approach is naturally dependent on a homogenous network and client architecture, and is furthermore limited to a local network.

Social bookmarking is a mechanism whereby individuals store URL/URI data such as "favorites" or "bookmarks on an internet server rather than on their local machine. By accessing a particular website they can thereafter access this information from any internet computer. This technology is limited to URL data.

SUMMARY OF THE INVENTION

In one illustrative embodiment, a method is provided for enabling unified setting adjustment in a client device connected to a data network. The illustrative embodiment defines a plurality of environment models corresponding, to a plurality of operating environments, stores setting data, and stores a client application. The illustrative embodiment transmits the client application to the client device for execution thereon over the data network on demand and receives an environment model request from the client application as executed on the client device. The illustrative embodiment transmits a selected one of the plurality of environment models in response to the environment model request and receives a setting data request from the client application a executed on the client device. The illustrative embodiment transmits selected setting data in response to the setting data request.

In other illustrative embodiments, a system/apparatus is provided. The system/apparatus may comprise one or more processors and a memory coupled to the one or more processors. The memory may comprise instructions which when executed by the one or more processors, cause the one or more processors to perform various ones of, and combinations of the operations outlined above with regard to the method illustrative embodiment.

In yet another illustrative embodiment, a computer program product comprising a computer useable or readable medium having a computer readable program is provided. The computer readable program, when executed on a computing device, causes the computing device to perform various ones of and combinations of, the operations outlined above with regard to the method illustrative embodiment.

Further advantages of the present invention will become clear to the skilled person upon examination of the drawings and detailed description. It is intended that any additional advantages be incorporated herein.

BRIEF DESCRIPTION OF THE DRAWINGS

Preferred embodiments of the present invention will now be described with reference to the accompanying drawings, in which.

DETAILED DESCRIPTION

Figure 1:
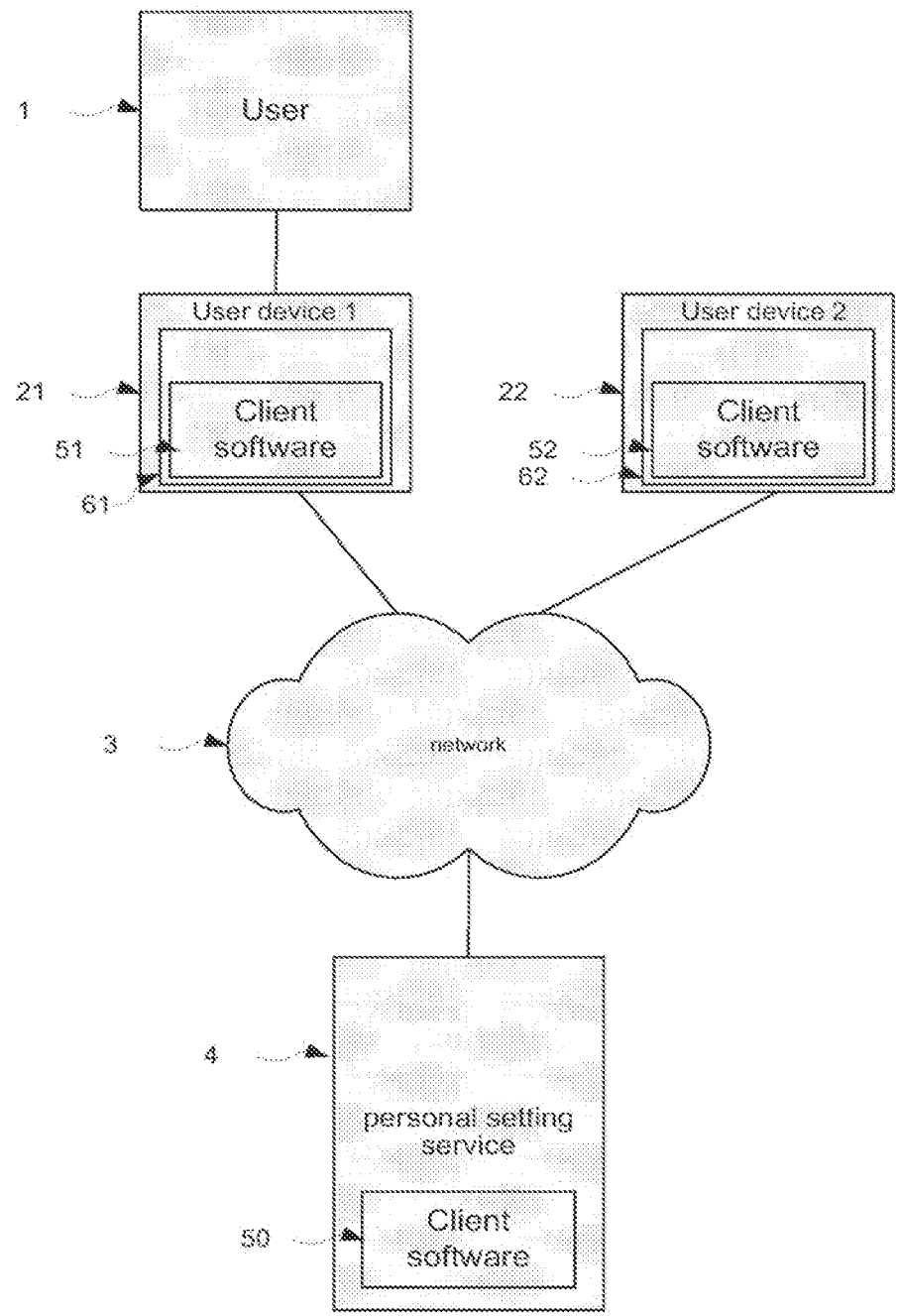
FIG. 1 shows a possible operating environment for certain embodiments.

A user for example in a internet point or using a different profile in the same machine (the customization profile is preferably decoupled from login of the machine since using same login you must be able, to use multiple customizations) can connect to a web server to download and install a java application or a browser plug-in (the first time he accesses to this service from that browser) in order to customize his environment.

Once authenticated, he can choose the personalization to be performed in whatever application installed and eligible to be user customizable. For example he can replicate in the system his browser settings (favorites, cookies, forms etc) or word templates as a clone of environment setting of his personal machine.

A backup of current system configuration may be carried out automatically when the user logs in, in order to be able to restore the original configurations when user logs off, preserving privacy and maintaining the original machine settings.

The customization can depend on pre-defined profiles to allow the user customization of a subset of settings, for example only browser settings.

The following basic steps may be performed:
Internet point client logs to the web server in order to perform customization
Download java application or a browser plug-in (if not present)
System automatically backs up configuration and settings
Ask to the storage the needed customization
Get requested settings From the point of view of a client device, there may be provided a method comprising the following steps:
determining details of the environment at said client device,
selecting an environment model as a function of said environment,
retrieving setting data from said data network;
transforming said setting data so as to conform to said environment with reference to said environment model; and
adjusting settings in a client device so as to incorporate said transformed setting data with reference to said environment model.

Preferably communications over the data network will involve a remote server. The term server in this context should be interpreted in the broadest possible sense, and may in particular include a number of separate computing devices, storage devices etc, which may be distributed or collocated in any suitable manner. Functions may be distributed among such devices as appropriate. The software environments on these devices may be heterogeneous or homogeneous, as may be the mechanisms and protocols adopted for implementing communications between each other and with the client device.

Correspondingly, from the point of view of such a server, there may be provided a method comprising the following steps:
defining a plurality of environment models corresponding to a plurality of operating environments;
storing setting data;
storing a client application;
transmitting said client application to a client device for execution thereon over said data network on demand;
receiving an environment model request from said client application as executed on said client device;
transmitting a selected one of said environment models in response to said environment model request;
receiving a setting data request from said client application as executed on said client device; and
transmitting selected setting data in response to said setting data request.

These two aspects of the invention are thus complementary.

From a technical point of view the system may be implemented through an application running on an application server. The application may communicate with a plug-in installed on the browser client. In other words, there may be provided a further step of downloading a personalization application from a data network, and executing said personalisation application at said client device, which personalisation application then carries out certain steps as described by way of example herein.

One advantage of this approach the fact that a user leveraging a web service can easily replicate his environment. Moreover personal customizations can be password protected and the initial system configuration is restored when user log off. This ensures privacy of the user data.

Settings that may be adjusted may include by way of example display resolution, desktop wall paper, desktop and "start bar" shortcuts, colour settings, default font settings, default printer settings, default associations of particular file types with particular applications, keyboard shortcut settings, user URLs ("favourites" or "Bookmarks"), web browser auto-fill data such as password data, web browser security settings, firewall settings, antivirus software settings, default word processor templates, word processor macro enablement, word processor language settings, email account settings such as SMTP and POP details, contacts names, address and other details, diary settings, timer settings, username and password, FTP settings, settings for graphics programs, spreadsheets, accounting software etc. Many further settings will suggest themselves in the context of different client devices.

In some cases extra data may be downloaded from the internet to provide desired functionality, for example in the case of user URL data, macros, user dictionaries, personal templates etc.

FIG. 1 shows a possible operating environment for certain embodiments. As shown in FIG. 1 there are provided a number of user devices 21 and 22, which are used from time to time by a user 1. These devices are capable of communication with a communication network, such as the communication network 3, which is in turn connected to a personal setting service 4, as will be described hereafter. The devices in question may be any device capable of interacting with the personal setting service and having internal settings suitable for personalisation. Such devices may include for example personal or other computers, mobile telephones, personal digital assistants, games consoles, television set top boxes network enabled kitchen appliances, CAD/CAM equipment etc. The communications network may include for example from a physical point of view satellite communications, cable television transmission channels, radio links or other wireless links, electrical cables, optical cables, mains supply cables, telephone lines or any other channel as will occur to the skilled person. Similarly from a functional point of view the network may include for example Ethernet, token ring, ISDN etc as will readily occur to the skilled person. Preferably the network in question is the internet. The personal setting service 4 may be connected to a plurality of different networks, so as to offer a corresponding service to a particular user for devices used by that user connected to those respective different devices, for example so that personalised settings may be used on a mobile phone or a personal computer by reference to the same personal setting service.

Figure 2:
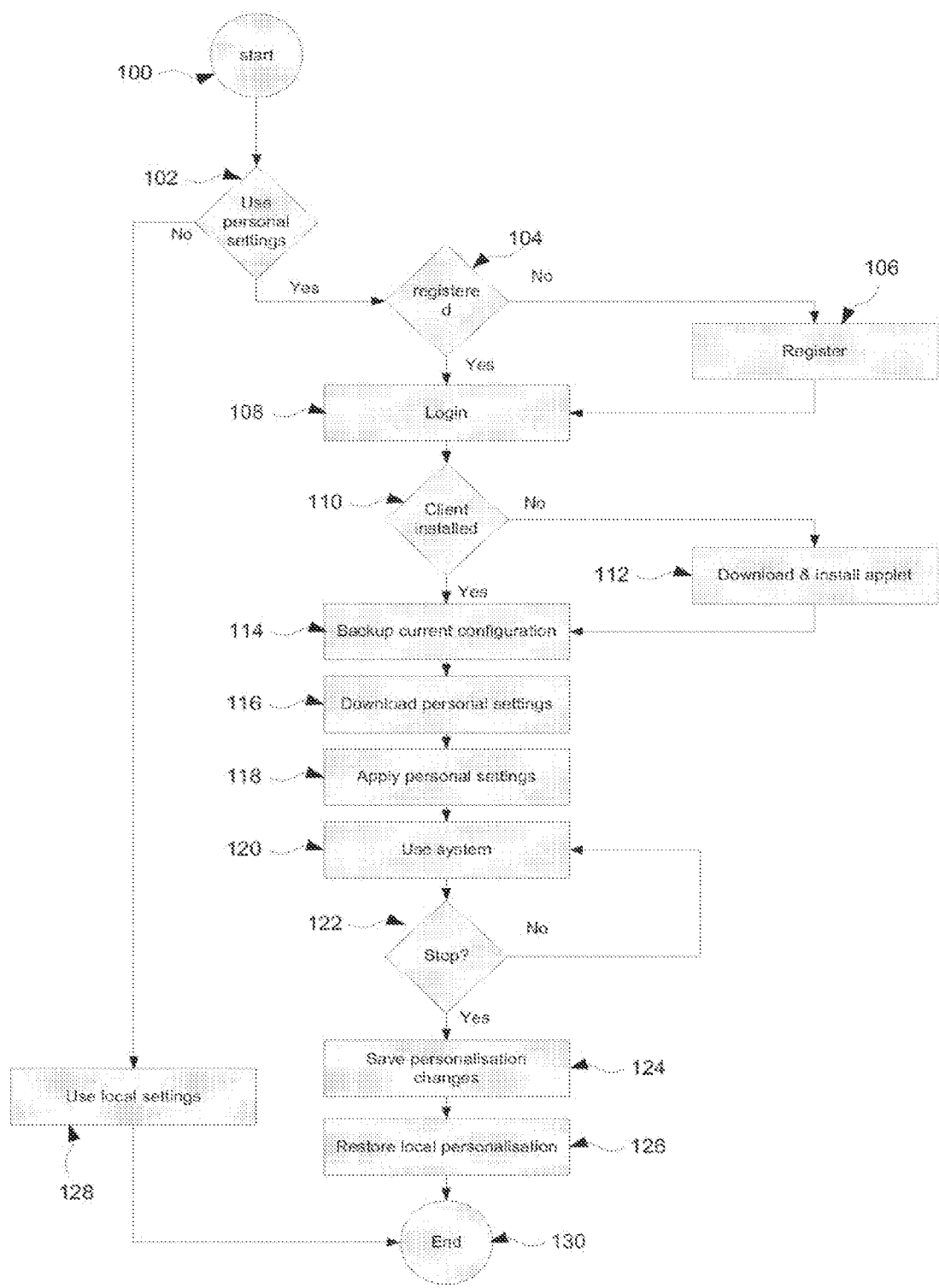
FIG. 2 is a flow chart according to a first embodiment.

FIG. 2 is a flow chart according to a first embodiment. As shown in FIG. 2, the method starts at step 100. It is first determined at a step 102 whether a user desires to use personal settings. This choice may be by default, in that unless the user explicitly requests the use of personal settings, local setting will be used. Requesting the use of personal settings may for example take the form of the user connecting to the internet, accessing a particular URL associated with a personal setting service, and clicking a button or other interface feature provided at that website corresponding to a request for service, or filling in text boxes with login and password information or similar identification steps. It is then determined whether the user in question has registered for the personal setting service, the method proceeds to a step 108 of logging the user in to the service. The step 104 of determining whether a user is registered or not may for example be a matter of offering the user the option of clicking a button or other interface feature provided at that website to indicate that he is not yet a registered user, or may take the form of detecting a failed login attempt. In a case where it is determined at step 104 that a user is registered to use the service, the method proceeds to step 108 of logging the user into the personalisation service. In a case where is determined at step 104 that a user is not registered to use the service, the method proceeds to step 106, where the user is given the opportunity to acquire registered status. This step will preferably involve gathering certain data concerning the user, for example identification information. The step 104 of registering may also comprise gathering information about the service required by the user, for example in terms of the various computers frequently used by the user, and the environments present on these computers. The user may also have the opportunity of choosing from various options concerning the detailed manner in which the service operates, as will be come clear in the following description. The step may also include gathering payment information, so that in a case where payment is demanded for the provision of the personalisation service such payment can be gathered. Once the user has completed the registration process, the method proceeds to step 108 of logging the user into the personalisation service. Logging the user into the system preferably calls for the submission of identifying information submitted by the user at this or an earlier stage, to ensure that the personalisation information stored for a particular user is not available to other, unauthorised users. This may take the form of the submission of a username and password, or the use of a smart card, biometric reader or any other authorisation technique as will occur to the skilled person. All communications between the user and the personal setting service are preferably encrypted, for example by means of a public-private key encryption system such as SSL. The method next determines at step 110 whether the software required for implementation of the personal setting service is already installed on the device from which the user is accessing the personal setting service. The software in question may consist of for example an adapted web browser, a web browser plug in or extension a java applet or other application running in a web browser environment, or any other suitable software. The software is preferably relative small in terms of file size so as to permit rapid transmission over the network. The software 51 is also preferably platform independent so as to permit use of the same software on different devices. Java is well suited to such applications. If I is determined at step 110 that the client software 51 is already installed at the client device 21, the method proceeds to step 114. Otherwise, the method proceeds to step 112, at which the client software is downloaded for example from the personal setting service 4 to the device 21. As an alternative, the user may install the client software from a local source such as a CD ROM etc. Suitable software may also be made available as a part of operating software for particular devices, or as an update for such operating software which may for example be automatically installed on the device as part of an automated maintenance process as is known in the art. Furthermore, in a case where the personal setting service is based on an internet site and where the client software 51 is a web browser plug in or applet, arrangement may be made such that said software will automatically be installed and executed when said web page is opened. Once the client software 51 is installed, the method proceeds to step 114. At step 114, the client software is executed, and proceeds to copy such local settings as are to be personalised so as to back up the current configuration at the device 21. The method next proceeds to step 116 at which personal settings are downloaded from the personal settings service 4, and at step 118 these are applied to the local settings of the device 21. The user may then proceed to use the device 21 with its settings personalised to his taste, and will continue to do so until at step 122 the method determines that the user no longer requires the personalised settings. The method may make this determination for example on the basis of an attempt by the user to turn the device 21 off, to put it in a standby mode, to log out of the operating environment, so disconnect form the internet, to terminate any particular application, to terminate the client application or by any other specified manipulation of the client application or by any specified interaction with the personal setting service 4. By way of example, the client application may provide a button or similar interface element marked "end personalisation" or similar. When at step 122 it is thus determined that the user no longer requires the personalised settings, the method proceeds to step 124, at which any changes made to the personalised settings as applied to the device 21 during the personalised session are detected and saved, before the local settings previously in effect and as saved at step 114 are restored at step 126. The method then terminates at step 130.

Figure 3:
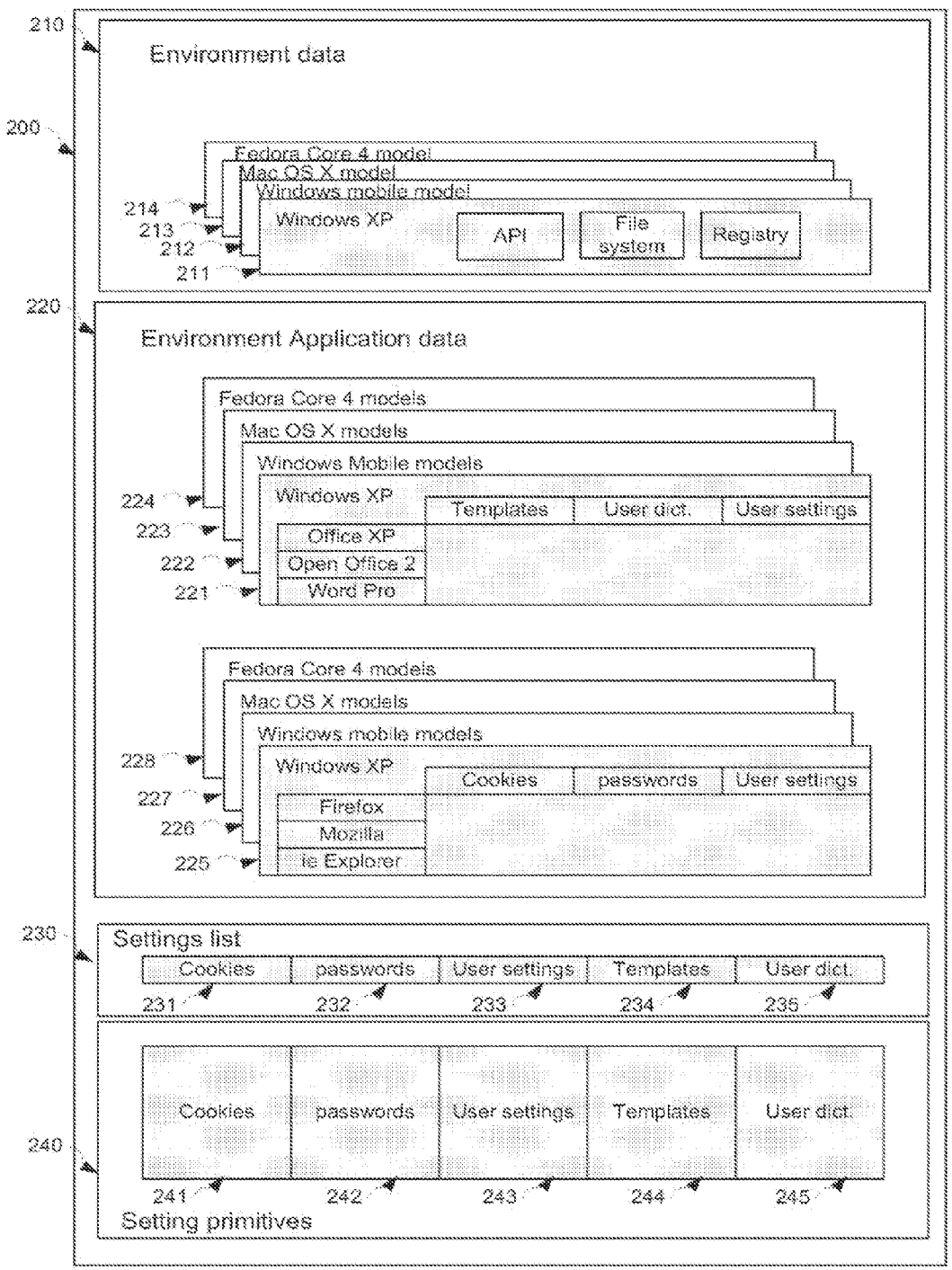
FIG. 3 shows according to a second embodiment an approach for handling differences in local environments to be personalised

As described above, it is desired that the setting personalisation features should be as broadly applicable as possible. This calls for some consideration of the environment 61, 62, to be found in each device to be personalised 21, 22. These environments may vary in a number of regards. FIG. 3 shows according to a second embodiment an approach for handling differences in local environments to be personalised. As shown in FIG. 3 there is provided a database 200, which comprises a environment data structure 210 and a environment application data structure 220. The environment data structure 210 contains a model 211, 212, 213, 214 for each possible operating environment 61, 62 which may be found on a device 21, 22 compatible with the personal setting service 4. By way of example, the operating environment may be defined by the operating system running on the device 21, 22, such as for example MacOS X®, Windows XP®, Windows Mobile Edition® or a linux distribution such as fedora core 4®, or any of the many other such operating systems as will readily occur to the skilled person. In some cases it may be necessary to provide separate models of different builds or service pack versions. These environment models 211, 212, 213, 214 define, for each respective operating environment the means necessary for the client software 51, 52 to interact with that particular operating environment so as to establish what personalisable applications are present. Such means may comprise details of API calls suitable for example to determine the presence of particular applications, details of standard file structures, file name formats and system file names, and where applicable information concerning the structure of registry databases or similar. This information is selected and structured such that the client software on determining the nature of the environment in which it is operating can retrieve the appropriate environment model, and using the information therein to interrogate the local environment to determine what personalisable applications are present.

As an alternative approach, the personal setting service may be able to determine the environment at the local device remotely, for example by requesting information from a web browser running at the local device, or otherwise. In such a case at the step 112 described above the software downloaded to the client device 21 may also include the environment model necessary for the environment in question. Still further, there may be defined a plurality of client softwares offering similar functionality but adapted for different operating environments, so that no separate environment model is required. In order to offer the broadest possible range of device and environment compatibility, a combination of any or all of these approaches may be adopted, in which case the personal setting service will also incorporate functions for determining a preferred approach in any given situation, or as a function of prior user settings.

Thus there may be provided the further steps of using an environment model to determine details of the application software environment at the client device, and selecting an application model as a function of the application software environment, wherein the step of transforming is carried out so that said setting data conforms to said application software environment, and the step of adjusting is carried out with reference to said application software environment.

The data structure 200 further comprises an environment application data set 220.

There is defined a set 230 of all personalisable settings that the personal setting service is able to handle, which are subdivided by the type of application to which they apply 231, 232, 233, 234, 235. Correspondingly for each personalisable setting in said list 230 for which the user requires a personalisation function there is defined a setting primitive 241, 242, 243, 244, 245. A setting primitive is setting data in a standard format which can readily be translated into the specific format called for by a particular application in a particular operating environment. Setting primitive formats may be defined as required, or may adopt existing formats. Where available, the service preferably uses standard based formats. For example, the data contained in Firefox®/Mozilla®/Netscape Navigator® bookmarks and Microsoft internet Explorer® "Favorites" may be stored in the XML based Xbel format.

Figure 4:
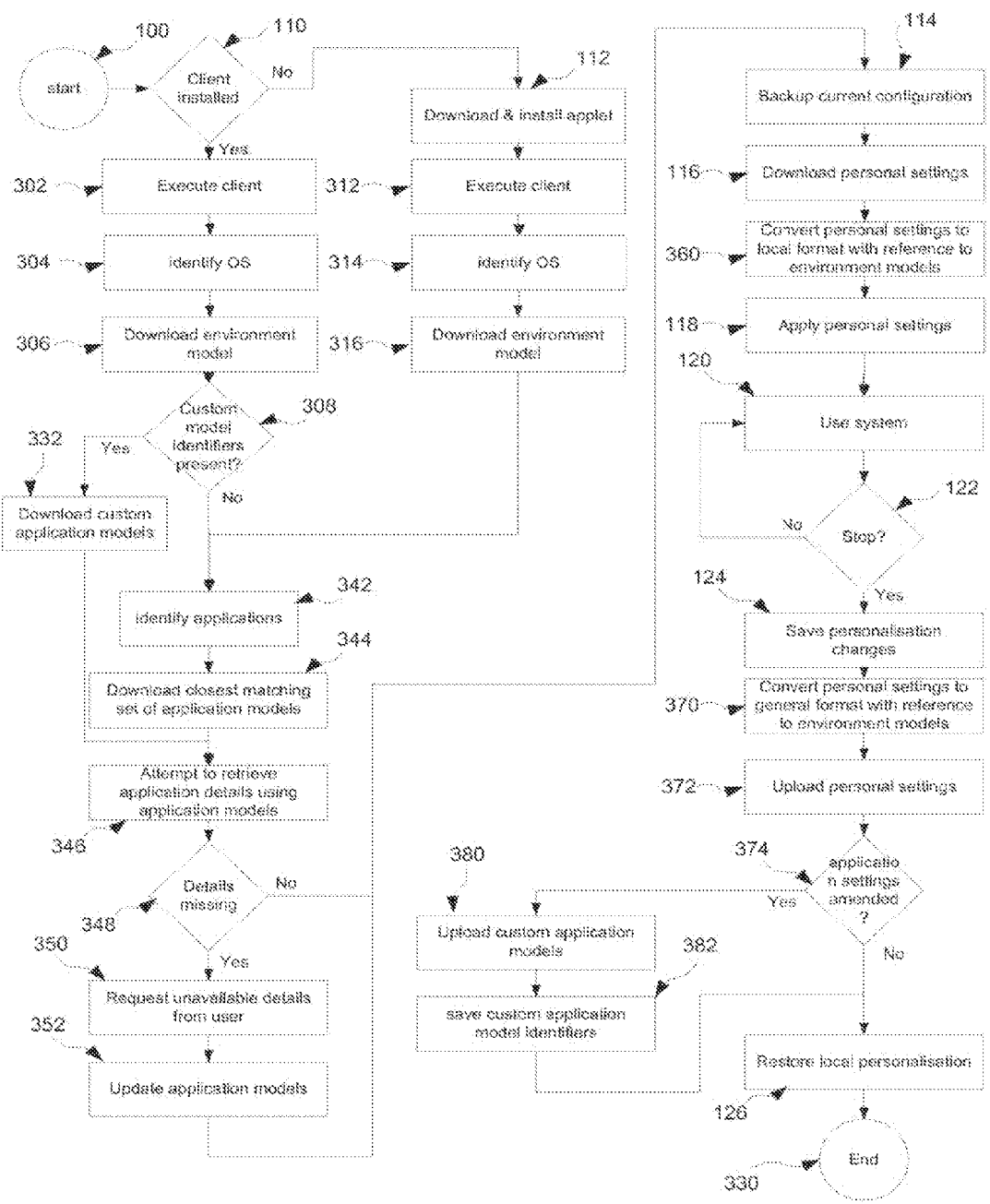
FIG. 4 shows a second embodiment.

FIG. 4 shows a second embodiment. The embodiment of FIG. 4 is a development of that of FIG. 2.

As shown in FIG. 4, the method starts at step 100. Steps 102 to 108 as described with reference to FIG. 2 may be carried out as described above or otherwise, but are not shown. The method according to the second embodiment determines at step 110 whether the software required for implementation of the personal setting service is already installed on the device from which the user is accessing the personal setting service. If it is determined at step 110 that the client software 51 is already installed at the client device 21, the method proceeds to step 302 whereupon the client is executed, and identified the operating environment at step 304. As described above, the operating system may be defined fully or in part by the operating system running on the device. Once the operating environment is identified, an appropriate environment model as described with respect to FIG. 3 is downloaded at step 306. At step 308 the method uses the environment model thus downloaded to determine whether any custom model identifiers are provided or called for in the local environment. If such custom models are called for, the method downloads the requisite custom models before proceeding directly to step 346. Otherwise the method proceeds to step 342.

Meanwhile, in a case where it is determined that the client software is not installed, the method proceeds to step 112, at which the client software is downloaded for example from the personal setting service 4 to the device 21. The method proceeds to step 312 whereupon the client is executed, and identified the operating environment at step 314. As described above, the operating system may be defined fully or in part by the operating system running on the device. Once the operating environment is identified, an appropriate environment model as described with respect to FIG. 3 is downloaded at step 316. The method then proceeds to step 342

At step 342 the environment model downloaded at step 306 is used to interrogate the local operating system so as to determine which applications of types for which the user has requested personalisation are installed. The method then downloads application models for the identified applications. At step 346 the method uses all available application models, whether standard or custom, to retrieve local setting information from the applications installed locally. At step 348 the method determines whether all required details have been satisfactorily retrieved. Where all details have been retrieved the method proceeds to step 114. Other wise, the method proceeds to step 350, whereupon the method instantiates a dialogue with the user, requesting that the user provide information locating the missing data. For example, where a user uses a custom user dictionary which he stores in a personal directory such as c:/documents and settings/administrator/my documents/dic/ rather than the default directory defined by the application, such as c:/program files/word processor/dictionaries/, the user can be asked to indicate the new, non standard location. Once the necessary information has been supplied, the application models can be updated as required and the method can proceed to step 114.

At step 114, the client software is executed, and proceeds to copy such local settings as are to be personalised so as to back up the current configuration at the device 21. The method next proceeds to step 116 at which setting primitives are downloaded from the personal settings service 4. The primitives are converted at step 360 to the required local format with reference to the environment and application models, and at step 118 these are applied to the local settings of the device 21. The user may then proceed to use the device 21 with its settings personalised to his taste, and will continue to do so until at step 122 the method determines that the user no longer required the personalised settings. The method may make this determination for example on the basis of an attempt by the user to turn the device 21 off, to put it in a standby mode, to log out of the operating environment, so disconnect form the internet, to terminate any particular application, to terminate the client application or by any other specified manipulation of the client application or by any specified interaction with the personal setting service 4. By way of example, the client application may provide a button or similar interface element marked "end personalisation" or similar. When at step 122 it is thus determined that the user no longer requires the personalised settings, the method proceeds to step 124, at which and changes made to the personalised settings as applied to the device 21 during the personalised session are detected and saved. The amended settings are converted to setting primitives with reference to the environment and application models at step 370, and uploaded to the personal setting service at step 374. The method next determines at step 374 whether the environment or application models have been amended. Where the environment or application models are found to have been amended the resulting custom models are uploaded at step 380 and saved at step 382. Finally, the local settings previously in effect and as saved at step 114 are restored at step 126. The method then terminates at step 130.

Further details of possible implementations will now be discussed. In a first phase, the method determines what operating system is running at the client site. The method retrieves an environment model corresponding to the detected operating system from a personalisation server, which provides the details necessary to interrogate the operating system to determine what software is installed at the client site that is susceptible of personalisation. For example, the environment model for Windows XP Pro SP 2 may contain details of an API call identifying the default web browser as well as other installed programs, instructions for searching the client site file system to search for particular pieces of software this or preferably instructions for interrogating a registry of installed programs.

Software susceptible of personalisation may include web browsers, word processors, email editors, or indeed any other piece of software. The operating system itself may also be treated as susceptible of personalisation. The device may have firmware or other low level settings that can be accessed. The list of software susceptible of personalisation may be restricted according to a set of user preferences stored for example at the personalisation server, for example, while the system may be capable of handling a wide range of different applications, a particular user may only require browser personalisation. The user may also be offered the choice of which pieces of software are to be personalised at run time.

Different profiles may be defined for a particular user for different environment or different needs, for example a personalization for office machines and another one for a personal computer. Such profiles may be grouped together under a single master account for a particular user.

Once it has been determined what software present at the client site is to be personalised, the method proceeds to a second phase. In this second phase, the method retrieves an application model for each piece of software to be personalised from a database stored at the personalisation server. The application model will generally be different for each piece of software depending on the operating system in which it runs. The application model in each case will provide details of the manner in which setting information relevant to that piece of software is stored. For example, each application model will contain the names and locations of files and directories containing relevant information. This information may simply comprise default values, or custom models representing non standard configurations used by the user on other systems having similar configurations, or indeed custom configurations previously stored concerning the present system.

Indeed, one step of this second phase may be to determine whether the system has already been personalised according to the method, and where it has, selecting models on the basis of stored information about the previous personalisation. This information may be stored either locally, or at the personalisation server.

The method proceeds to interrogate the local system to retrieve personalisation information in accordance with the retrieved application models. Where original setting information is successfully retrieved, it is stored for later reinstatement. In a case where information is not found, due to idiosyncrasies in the local set up, the method may attempt to locate the information in secondary locations defined in the application model, or carry out a search in an attempt to locate the missing files, or request information from the user, or may retrieve alternative application models, or simply skip the information in question. The manner in which the method handles such systems may be defined according to a set of user preferences stored for example at the personalisation server. In a case where alternative models are used, there may be defined a hierarchy of models to try, with models relating to the same software and the same user having a high ranking, and models concerning similar software and a different user a lower ranking, etc. As a variant of this approach, a single model may be compiled on the fly to contain all reasonable possibilities is order of likelihood, on the basis of all relevant information available at the personalisation server.

Having thus established the location of all information to be personalised at the client site, the method now enters a third phase. The method retrieves personalisation data from the personalisation server. This personalisation data comprises representations of the desired personalisation, for each of the pieces of software susceptible of personalisation. The data is question will thus depend on the nature of the software. Web browser personalisations may include homepage, favourites, passwords etc. Word processors may call for user dictionaries, templates, languages settings etc and so on. These will be stored at the personalisation server in a generic format, and the software model for each piece of software will include instructions for translating the information into the format relevant to the software in question. For example, translating URL data into the Bookmarks.htm file used by firefox, or the .URL files used by internet explorer. The translated information will then be written to the client system, replacing the existing information. A copy of the translated information may also be stored separately in order to facilitate the detection of changes.

The user will now be able to use the client system as if it was his own, and will find his personalised settings in effect throughout the system.

Once the user has finished using the system in its personalised state, he will make the appropriate manipulation of the client personalisation application. This may simply be a matter of closing the application.

When the application detects such a manipulation, it will compare the personalisation data as distributed throughout the system with the copy of the translated information in order to determine if any changes have been made. Where a change is detected, the modified data will be translated into the appropriate generic format using the relevant model, and transmitted to the personalisation server, where it will replace the obsolete data stored therein. Alternatively, a complete set of personalisation data may be transmitted, without attempting to identify changes. The update of stored configuration must be optional so the application will ask if it identifies changes if and what to upload.

The method will then replace all personalised data with the original setting information stored during the second phase.

In a case where during the first or second phases a model was found not to accurately reflect the local environment, a custom model will be prepared incorporating the variations. This custom model may be stored locally for use the next time the client personalisation application is executed. A custom model may also be uploaded to the personalisation server, on the basis that a particular user is likely to set up the different computers he uses in a similar manner, so that the custom model may offer a useful reference on other systems. Where a custom model is uploaded to the personalisation server, a reference to the uploaded model may be generated at the client site rather than storing the custom model locally.

The application can finally close, and users of the local system will be able to use local software as if it had never been personalised.

Figure 5:
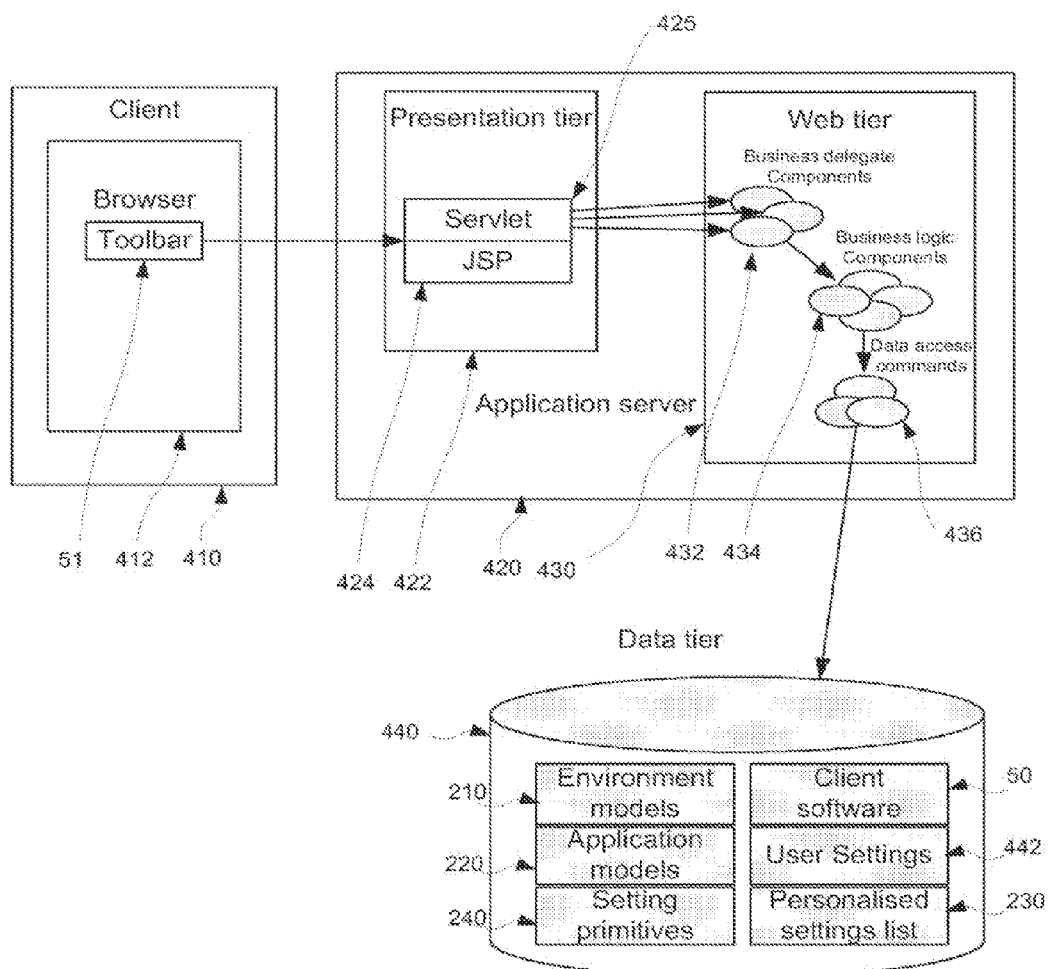
FIG. 5 shows a software architecture suitable for implementing certain embodiments.

FIG. 5 shows a software architecture suitable for implementing certain embodiments. As shown in FIG. 5, an architecture is distributed on logical tiers: Client 410, Web 420 and database 440. In the web tier 420 there is provided a presentation tier 422 implementing a web container comprising a Servlet 425 and JSP Engine 424. A web tier component 430 is provided as part of the web 420, and comprises for example business delegate components 432 instantiated by the presentation tier 424, Business logic 434 implemented adopting the java beans standard, and data access commands 436. The business delegate components 432 use the Business logic components 434, which in turn use the data access commands 436. These data access commands 436 then interface with the data tier 440. The data tier 440 may contain the environment models 210, Application models 220, setting primitives 240, client software 50, user settings 442 and personal settings list 230 as described above.

Figure 6:
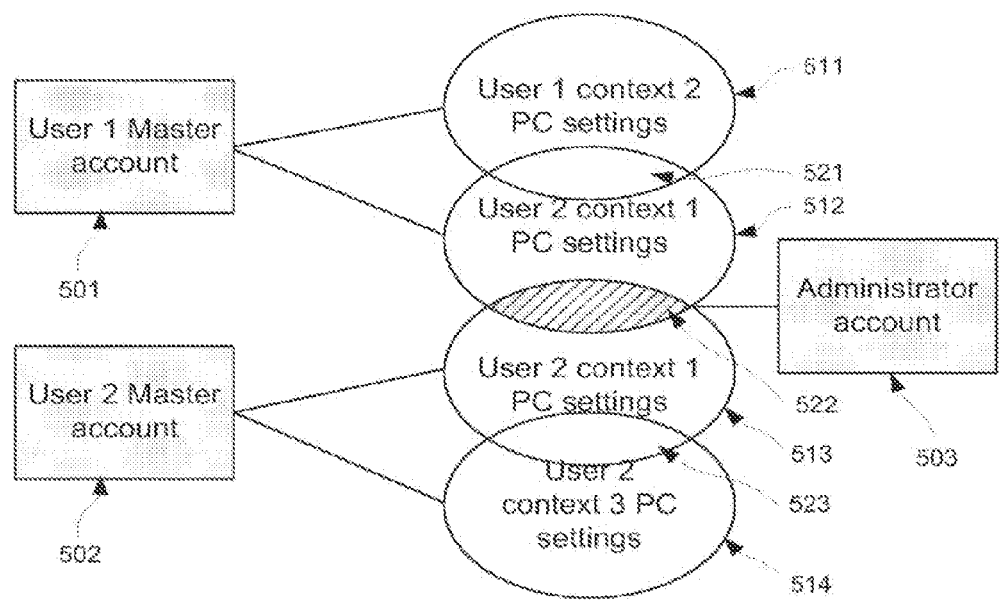
FIG. 6 shows a third embodiment.

FIG. 6 shows a third embodiment. The third embodiment provides certain further developments of the preceding embodiments. Specifically, the functionality may be extended by defining master accounts 501, 502 which relate to one or more user accounts (511, 512, 513, 514) as described above. The environment models 210, Application models 220, setting primitives 240, client software 50, user settings 442 and personal settings list 230 defined in these accounts may to some extent overlap, as indicated by the regions 521 and 523. By way of example, a master user may define a separate account for discrete device classes such as "personal" or "work". Naturally, the master us may very well wish certain settings to be common to some or all classes of device, or user account.

Furthermore, there may be defined an administrator account 503. Such a user account may define and control a data set comprising some or all of environment models 210, Application models 220, setting primitives 240, client software 50, user settings 442 and personal settings list 230. The administrator may then authorise certain users to access these settings in common with other users. By these means, an administrator may centrally administer the settings for all users for example in a particular context, for example the work computers of employees of a particular enterprise, or members of a family. Still further, it may be possible to define junior user accounts where some are all setting cannot be accessed by the user, but only by an administrator. Depending on context, a particular individual may have junior, user and administrative accounts. The accounts may be protected using authentication and data protection techniques as will readily occur to the skilled person.

The term "user" as employed in the preceding description refers to the one or more individuals using a particular account. According to certain embodiments, certain settings in separate accounts may be associated so as to enable centralised control from an administrator account.

According to a further embodiment, there is offered a setting primitive import function, whereby a user can upload selected setting from a device 21, which will be translated using appropriate environment and application models so as to generate setting primitives for storage by the personal setting service. This function is particularly important for new users for whom no setting primitives are defined, but will also be required whenever a user wishes to start personalising a setting which heretofore had not been personalised. This feature may be offered as a stand alone feature, or during a personalisation session.

Parts of the above description describe embodiments from the point of view of the client device and the software running on it. The skilled person will appreciate that the invention may equally be understood from the point of view of the personal setting service. For example, there may be provided a method of enabling unified setting adjustment in a client device connected to a data network, comprising the steps of defining a plurality of environment models corresponding to a plurality of operating environments storing setting data, storing a client application, transmitting the client application to a client device for execution thereon over said data network on demand, receiving an environment model request from said client application as executed on said client device, transmitting a selected one of said environment models in response to said environment model request, receiving an setting data request from said client application as executed on said client device and transmitting selected setting data in response to said setting data request.

Furthermore, such a method may be extended to correspond to any of the variations falling within the scope of the invention, and in particular as described above. For example, the method may comprise the further steps of receiving new setting data from said client application as executed on said client device, and storing said new setting data.

Still further, the method may comprise the further steps of receiving a new environment model from said client application as executed on said client device, and storing said new environment model.

Still further, the method may comprise the further steps of defining a plurality of application models corresponding to a plurality of applications, storing said application models, receiving an application model request from said client application as executed on said client device, and transmitting a selected one of said application models in response to said application model request.

Still further, the method may comprise the further steps of receiving a new application model from said client application as executed on said client device, and storing said new application model.

In the various embodiments described, there are presented a number of different combinations of features. The skilled person will appreciate that many of these can be collated in many different combinations besides those explicitly described. For example, The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method of enabling unified setting adjustment in a client device connected to a data network, the method comprising:
    storing a plurality of environment models corresponding to a plurality of operating environments each environmental model defy a set of personalisable applications typically available in an operating environment;
    storing setting data, wherein respective setting data is specific to a respective personalisable application;
    storing a client application;
    transmitting the client application to the client device for execution thereon over the data network on demand;
    receiving an environment model request from the client application as executed on the client device, the environment model request indicative of an operating environment on the client device;
    transmitting a selected one of the plurality of environment models in response to the environment model request, wherein the selected environment model defines the set of personalisable applications for the operating environment on the client device;
    receiving a setting data request from the client application as executed on the client device; and
    transmitting selected setting data in response to the setting data request.

2. The method of claim 1, further comprising:
    receiving new setting data from the client application as executed on the client device, and
    storing the new setting data.

3. The method of claim 1, further comprising:
    receiving a new environment model from the client application as executed on the client device, and
    storing the new environment model.

4. The method of claim 1, further comprising:
    storing a plurality of application models corresponding to a plurality of applications, each application model defining an application of the set of applications on the client device for which a user of the client device has requested personalisation;
    receiving an application model request from the client application as executed by the selected environment model on the client device; and
    transmitting a selected one of the application models in response to the application model request.

5. The method of claim 4, further comprising:
    receiving a new application model from the client application as executed on the client device, and
    storing the new application model.

6. A system comprising:
    a processor; and
    a memory coupled to the processor, wherein the memory comprises instructions which, when executed by the processor, cause the processor to:
    store a plurality of environment models corresponding to a plurality of operating environments, each environmental model defining a set of personalisable applications typically available in an operating environment;
    store setting data, wherein respective setting data is specific to a respective personalisable application;
    store a client application;
    transmit the client application to the client device for execution thereon over the data network on demand;
    receive an environment model request from the client application as executed on the client device, the environment model request indicative of an operating environment on the client device;
    transmit a selected one of the plurality of environment models in response to the environment model request, wherein the selected environment model defines the set of personalisable applications for the operating environment on the client device;
    receive a setting data request from the client application as executed on the client device; and
    transmit selected setting data in response to the selling data request.

7. The system of claim 6, wherein the instructions further cause the processor to:
    receive new setting data from the client application as executed on the client device; and
    store the new setting data.

8. he system of claim 6, wherein the instructions further cause the processor to:
    receive a new environment model from the client application as executed on the client device; and
    store the new environment model.

9. The system of claim 6, wherein the instructions further cause the processor to:
    store a plurality of application models corresponding to a plurality of applications, each application model defining an application of the set of applications on the client device for which a user of the client device has requested personalisation;
    receive an application model request from the client application as executed by the selected environment model on the client device; and
    transmit a selected one of the application models in response to the application model request.

10. The system of claim 9, wherein the instructions further cause the processor to:
    receive a new application model from the client application as executed on the client device, and
    store the new application model.

11. A computer program product comprising a non-transitory computer readable medium having a computer readable program recorded thereon, wherein the computer readable program, when executed on a computing device, causes the computing device to:
    store a plurality of environment models corresponding to a plurality of operating environments, each environmental model defining a set of personalisable applications typically available in an operating environment;
    store setting data, wherein respective setting data is specific to a respective personalisable application;
    store a client application;

transmit the client application to the client device for execution thereon over the data network on demand;

receive an environment model request from the client application as executed on the client device, the environment model request indicative of an operating environment on the client device;

transmit a selected one of the plurality of environment models in response to the environment model request, wherein the selected environment model defines the set of personalisable applications for the operating environment on the client device;

receive a setting data request from the client application as executed on the client device; and transmit selected setting data in response to the setting data request.

12. The computer program product of claim 11, wherein the computer readable program further cause the computing device to:

receive new setting data from the client application as executed on the client device; and store the new setting data.

13. The computer program product of claim 11, wherein the computer readable program further cause the computing device to:

receive a new environment model from the client application as executed on the client device; and store the new environment model.

14. The computer program product of claim 11, wherein the computer readable program further cause the computing device to:

store a plurality of application models corresponding to a plurality of applications, each application model defining an application of the set of applications on the client device for which a user of the client device has requested personalization;

receive an application model request from the client application as executed by the selected environment model on the client device; and transmit a selected one of the application models in response to the application model request.

15. The computer program product of claim 14, wherein the computer readable program further cause the computing device to:

receive a new application model from the client application as executed on the client device, and store the new application model.

* * * * *